Inventor
CHARLES FREDERICK STEVENTON
JERZY WLADYSLAW CZOCH
By
Aaron R. Townshend Attorney

United States Patent Office 3,153,109
Patented Oct. 13, 1964

3,153,109
AUTOMATIC ELECTRICAL CONTROL SYSTEM
FOR FLAME-CUTTING MACHINES
Charles Frederick Steventon and Jerzy Wladyslaw Czoch,
London, England, assignors to The British Oxygen
Company Limited, a British company
Filed Nov. 12, 1958, Ser. No. 773,491
Claims priority, application Great Britain Nov. 19, 1957
2 Claims. (Cl. 266—23)

This invention relates to an automatic electrical control system for flame-cutting machines, and has for its object to provide a system whereby the entire operations involved in producing a contoured plate or the like by means of a flame-cutting machine are effected automatically by electrical control means.

It has already been proposed to move a tool relative to a workpiece by an electrical control system incorporating a record such as magnetic tape, whereby a desired profile or contour is produced automatically by the tool in accordance with information stored in the record.

The application of such a system to a flame-cutting machine presents special problems, however, because a flame-cutting operation involves the steps of turning on and igniting the preheat gases and allowing the appropriate time for heating the work before starting the flow of cutting oxygen, said steps being referred to collectively hereafter as "the establishment of a cutting flame."

According to the present invention, in a flame-cutting machine in which a cutting nozzle is guided for movement relatively to the work under the control of a pre-recorded record means, provision is made for rendering the record means inoperative and initiating an automatic performance, by separate electrical control means, of a sequence of operations for the establishment or re-establishment of a cutting flame, means also being provided for rendering the record means operative again when said sequence of operations has been completed.

The invention will now be described with reference to the accompanying drawings, in which.

Figure 1:
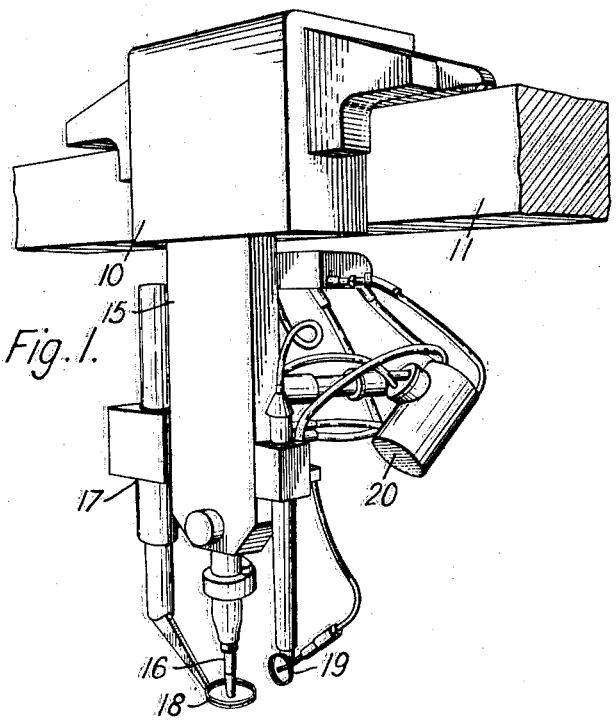
FIG. 1 is a fragmentary perspective view showing the cutting head of a flame-cutting machine.
Figure 2:
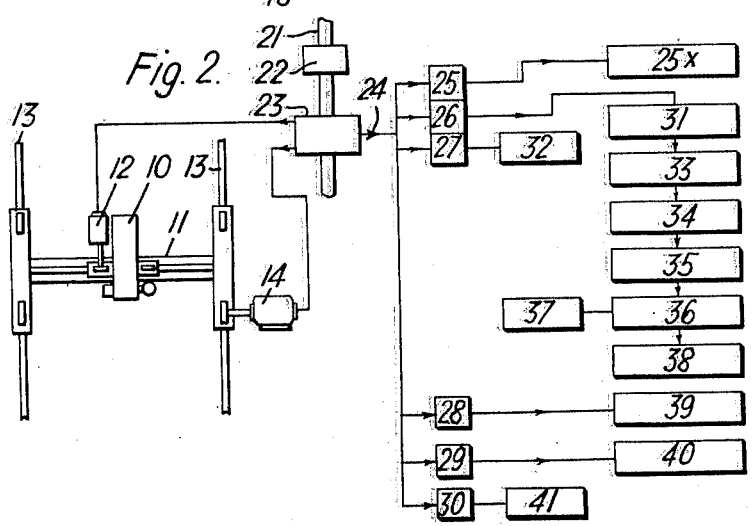
FIG. 2 is a schematic diagram which illustrates a cutting machine in conjunction with a "sequence of operations" chart.

Referring to FIGS. 1 and 2 of the drawings, a flame-cutting machine, e.g. for cutting contoured plates from sheet metal, comprises a cutting head 10 which is movable on a transverse beam 11 by means of an electric motor 12 (FIG. 2), while the beam 11 is movable bodily along guides 13 by another electric motor 14. A flame-cutting machine of this type is generally well-known so far as already described and indicated in the drawings, and since the general construction of the machine forms no part of the present invention it will not be further described.

Referring to FIG. 1 of the drawings, the cutting head 10 supports a vertically adjustable nozzle mounting block 15 which carries the flame-cutting nozzle 16, and it will be appreciated that the nozzle block 15 has the usual passages whereby a mixture of fuel gas and oxygen is supplied to the nozzle 16 to provide preheat gas for a preheat flame, and oxygen is supplied separately for cutting.

The nozzle block 15 also has secured thereto a height sensing device 17 having a probe part 18 adjacent the tip of the nozzle 16, the function of this height sensing device being to maintain the nozzle tip a predetermined distance from a plate which is being cut. It is not proposed to describe constructional and operational details of the height sensing device 17, since such details form no part of the present invention, except to explain that the height sensing device is electrical and controls a reversing servomotor, which is not shown in FIG. 1 but is referred to later, for rasing or lowering the nozzle block 15 relative to the head 10 as may be required to maintain the predetermined spacing between the tip of the nozzle 16 and the work. Also carried by the nozzle block 15 is an igniter device 19 and a photo-electric device 20 which is focused on the nozzle tip for sensing the presence or absence of flame at the nozzle tip, both these devices being referred to hereafter.

Referring now to FIG. 2 of the drawings, the energising of the driving motors 12 and 14 to cause movements of the cutting head 10 is effected in accordance with signals from a pre-recorded record means, such for example as a magnetic tape moving past a transducer head, and this is indicated diagrammatically in FIG. 2 wherein a record tape is indicated at 21, a driving mechanism for the record tape at 22, and a tape reading or decoding device at 23, the latter being indicated as transmitting signals to the respective driving motors 12 and 14 whereby the movements of the head 10 are controlled to produce a desired cut profile automatically in accordance with information stored in the record tape 21.

As already stated previously, the control of movements of a tool relative to a workpiece by an electrical control system incorporating a pre-recorded record such as magnetic tape has already been proposed, but in connection with the application of such a system to a flame-cutting machine the present invention provides a sequence of operations for the establishment of a cutting flame which is illustrated by the "sequence of operations" chart forming part of FIG. 2 at the right hand side thereof.

This sequence of operations chart represents operations in a time axis running from top to bottom of the chart and indicated thereon at 24 is the output from the tape reading device 23 of signals 25, 26, 27, 28, 29 and 30, their vertical spacing representing separation in time although the actual spacing does not represent proportion in time.

It is to be understood that signals 25 to 30 are separate and distinct from the train or trains of signals also on the tape for controlling the motors 12 and 14 which position the head 10 and when the cutting head 10 has been moved by motors 12 and 14 from a datum position to a starting position above the work at which a cut is to be commenced, in accordance with information decoded from the tape 21 by the reading device 23, signal 26 from the device 23 initiates a sequence of operations commencing with the rendering operative of the height sensing device 17 of FIG. 1, this operation being indicated by the rectangle 31 in FIG. 2. It will be appreciated that if the nozzle block 15 of FIG. 1 is in a raised position when the height sensing device is rendered operative, then the nozzle block 15 will descend until the nozzle tip is correctly spaced from the work. The photo-electric device 20 shown in FIG. 1 is preferably operative from the beginning of use of the machine, but if desired it could be arranged that the photo-electric device 20 becomes operative to detect flame in response to signal 26 which renders the height sensing device 17 operative.

Immediately after the tape signal 26 has initiated operation 31, the following tape signal 27 decoded by the reading device 23 effects the operation indicated by the rectangle 32, which operation consists of stopping the tape driving mechanism 22 so that the record means 21 is inoperative.

When the cutting nozzle 16 reaches the predetermined spacing from the work to be cut, a signal from the height-sensing system effects the operation of establishing the supply of preheat gas to the nozzle 16, this operation being indicated by the rectangle 33 in FIG. 1.

After a short delay the next operation of igniting the preheat gases at the nozzle is effected by the ignition device 19 of FIG. 1, and this operation is indicated by the rectangle 34 in FIG. 2. There then follows a dwell period during which the preheat flame heats up the work in preparation for cutting to commence, this preheat period being indicated by the rectangle 35 in FIG. 2. At the end of the preheat period comes the operation of turning on the cutting oxygen automatically which is indicated by the rectangle 36, and simultaneously with this operation comes the further operation, indicated by the rectangle 37, of starting the tape driving mechanism 22, so that the record means 21 becomes operative again and passes through the reading device 23 which decodes the information stored thereon to guide the cutting head 10 in cutting a desired contour on the work. Thus a sequence of operations for the establishment of a cutting flame has been carried out, terminating with the turning on of the cutting oxygen and rendering operative of the record means.

Immediately following the operation of turning on the cutting oxygen, indicated by the rectangle 36 in FIG. 2, is indicated by the rectangle 38 a further operation which is concerned with conditioning the photo-electric device 20 of FIG. 1 to be responsive to the cutting flame, since the latter is brighter than preheat flame, but this matter is explained hereafter.

Following the operation depicted by rectangle 38 comes an indefinite lapse of time during which a cutting operation is carried out in accordance with information stored on the tape 21, and it will be understood that this lapse of time will depend upon the actual cutting operation which is performed and will be different for different contours.

As the end of the cutting operation is approached, tape signal 28 is indicated as effecting the operation represented by rectangle 39 of de-energising the photo-electric device 20 of FIG. 1 and also locking the height sensing device 17 against operation to move the head 10, these requirements being found necessary to prevent erratic behaviour of these devices, since the completion of the cutting of a contour is accompanied by such occurrences as showers of sparks and the falling away of the cutout portion of the workpiece.

Tape signal 29 is indicated as effecting the operation, depicted by rectangle 40, of raising the head 10 and also turning off the supply of gases, and the following tape signal 30 is indicated as effecting the operation, depicted by the rectangle 41, of stopping the tape driving mechanism 22. This last operation will, of course, occur when the head 10 has been returned to the datum position.

At this point in the description it is appropriate to state that since at the end of a cutting operation the photo-electric device 20 and the height sensing device 17 of FIG. 1 have been locked against operation, the first tape signal 25 for a succeeding cutting operation must of necessity effect the operation, depicted by the rectangle 25$^x$, of resetting these devices for operation.

Figure 3:
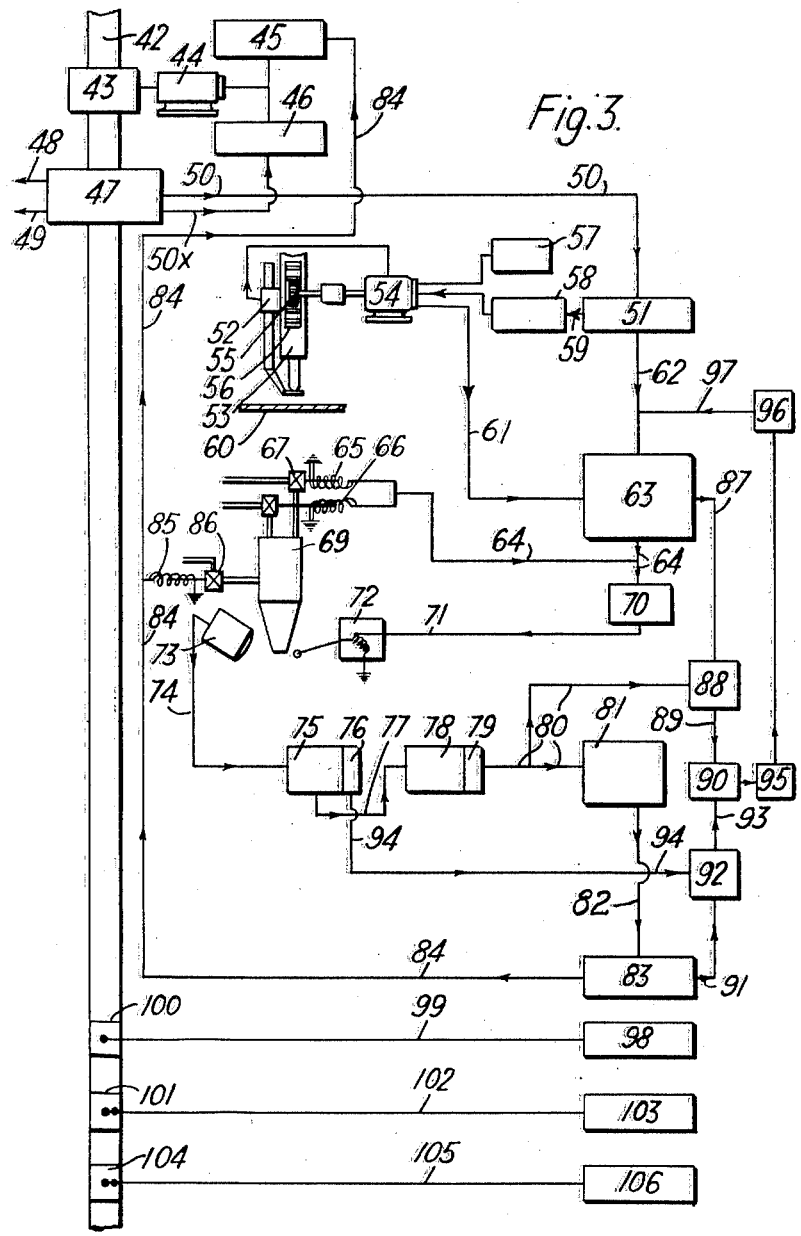
FIG. 3 is a further schematic diagram, which illustrates diagrammatically the electrical control means for establishment of a cutting flame at the cutting head, and is also set out as a "sequence of operations" chart.

The above described sequence of operations for the establishment of a cutting flame is effected by electrical control means which is separate from the electrical control means for effecting the contour-producing movements of the cutting head 10, and the electrical control means for the establishment of the cutting flame is depicted in diagrammatic form in FIG. 3 of the drawings. This diagram is similar to FIG. 2 in that it also has the layout of a sequence of operations chart having a time axis running from top to bottom thereof, but the diagram does not attempt to give details of electrical control circuitry since such circuitry detail is not claimed to be inventive per se.

Referring to FIG. 3 of the drawings, a pre-recorded record means is indicated by the tape 42, a tape driving mechanism is indicated at 43 and an associated electric driving motor at 44 having an electrical "start" control means 45 and a "stop" control 46. A tape reading device or decoder is indicated at 47, and signal outputs 48, 49 therefrom are respectively fed to the motors 12 and 14 of FIG. 2.

The sequence of operations for establishing a cutting flame commences with the tape reader 47 decoding a signal corresponding to the signal 26 of FIG. 2. This signal is not depicted in FIG. 3, but there is depicted by the line 50 an electrical output from the tape reader 47, which is followed almost immediately by the decoding of a "stop tape" signal by the tape reader 47, and the production of an electrical output depicted by the line 50$^x$ which is received by the "stop" control 46, whereby the motor 44 is stopped and the drive mechanism 43 ceases to operate so that the record means 42 is rendered inoperative.

The output in line 50 is received by an electrical control unit depicted at 51, which is conveniently a relay device, and is the electrical control means for the activation of the height sensing device 17 of FIG. 1. This height sensing device is depicted at 52 in FIG. 3 secured to the nozzle block 53 of a cutting machine. A reversing servomotor subjected to control by the height sensing device 52 is indicated at 54, and is shown as driving a pinion 55 in mesh with a rack 56 on the nozzle block 53, while the motor 54 is also indicated as having an "up" control 57 and a "down" control 58 which in practice would conveniently be field windings of motor 54. Returning now to the height sensing relay 51, when the latter receives an electrical input along line 50 it feeds an output to the "down" control of the motor 54, as indicated in FIG. 3 by the line 59, so that the nozzle block 53 and height sensing device 52 descend bodily towards the work which is indicated at 60.

Indicated by the line 61 extending from the motor 54 of the height sensing system is an output signal, but this signal is present only when the height sensing system detects that the spacing between the cutting nozzle and the work is correct. Height sensing relay 51 is providing a second output, indicated by the line 62 to an electrical control unit 63 which is conveniently a relay device, and is the electrical means for controlling the turning on of the preheat gas supply to the cutting nozzle 16 of FIG. 1. Output 62 to the heating gases relay 63 produces no output from said relay until output 61 is also being received by the relay 63 from the height sensing system, but when output 61 is established there is an output from relay 63, which is indicated by the line 64. Output 64 is fed to solenoids 65 and 66 to open valves 67 and 68 for establishing a supply of preheat gases to the cutting nozzle depicted at 69. Output 64 from relay 63 is also fed to a delay device indicated at 70, and delay device 70 operates after a short delay, which is only of sufficient duration for the preheat gases to purge the gas passages in the nozzle 69, to provide an output indicated by the line 71 to the ignition device indicated at 72, so that the preheat gases are ignited at the tip of the nozzle 69. The ignition device 72 of FIG. 3 corresponds to the device 19 of FIG. 1

Alongside the tip of the nozzle 69 is indicated a photo-electric device 73 which corresponds to the photo-electric device 20 of FIG. 1, and it will be remembered in connection with the description of FIG. 2 that current supply to activate the photo-electric device is established either as soon as the machine is started up or simultaneously with the operation of rendering the height sensing device operative, so that as soon as the preheat flame is established there is a signal output from the photo-electric device 73 of FIG. 3, which is indicated by the line 74.

Output 74 from photo-electric device 73 is fed to an amplifier unit 75 having an associated relay device 76. The output 74 is only of such strength as to represent preheat flame at the nozzle 69 and even when amplified by amplifier 75 does not operate relay 76. The output from amplifier 75 indicated by the line 77 is fed to a second amplifier unit 78 and after this second amplification is able to operate a relay device 79 associated with the second amplifier 78, so that an output indicated by the line 80 is fed to an electrical timer unit indicated at 81. Timer 81 determines the preheat period during which the preheat gases raise the work to cutting temperature, and since the preheat period can be expected to differ in dependence upon the material to be cut as regards its nature and thickness it will be appreciated that preheat timer 81 will be provided with manual pre-setting of the duration of the delay which it effects before an output therefrom, indicated by the line 82, activates the electrical control unit represented at 83. The output from control unit 83 is indicated by the line 84, and it will be seen that output 84 is fed to a solenoid 85 which opens a valve 86 for establishing a supply of cutting oxygen to the cutting nozzle 69, whereby a cutting flame is established at the end of the preheat period. Output 84 is also fed to the "start" control 46 of motor 44, so that the tape driving mechanism 43 commences to operate and the record means 42 is rendered operative to guide the cutting head of the machine to cut a contour.

It is appropriate at this point in the description, the sequence of operations for establishing a cutting flame and the separate electrical control means having been described, to return to the photo-electric device 73 to explain its "monitoring" control function in connection with the preheat flame and the cutting flame.

It has already been explained that an output 80 is derived from an output 74 from the device 73, the magnitude of output 74 representing preheat flame at the nozzle 69, and that double amplification of output 74 by amplifiers 75 and 78 operates relay 79 to give the output 80 for activating preheat timer 81. It will be apparent therefore that the absence of output 80 means that no preheat flame is present and gas flow must be stopped. Reference is now made to relay 63, abovementioned as the heating gases relay, and it will be noted that a second output from said relay 63 is indicated by the line 87 and is fed to an electrical delay device indicated at 88. Delay device 88 is set to operate after quite a short delay period which is of sufficient duration to allow the spark ignition device 72 reasonable time to ignite the preheat gases at the nozzle 69. If the preheat gases fail to ignite and thereby fail to cause photo-electric device 73 to produce output 74, then delay device 88 operates to produce output 89 which activates an electrical alarm and control unit indicated at 90. Normally however the amplified output 80 is fed to the delay device 88, as well as to the preheat timer 81, and the presence of output 80 at the delay device 88 prevents the latter from operating to activate the alarm unit 90.

The alarm and control unit 90 incorporates a visual or audible alarm, and it will be appreciated that it will also be required to exert a control function to nullify, as by cut-out switches, all the operations which have so far been carried out up to the failure of the appearance of preheat flame.

The photo-electric device 73 also exerts a "monitoring" control function in connection with the turning on of the cutting oxygen, which should produce much greater illumination conditions than the preheat flame.

It will be noted that there is a second output, indicated by the line 91, from the cutting oxygen control unit 83. This output 91 is fed to an electrical delay device 92 which has a similar function to delay device 88, in that after a short delay it will produce an output 93 which is fed to the alarm and control unit 90 in the absence of a second output 94 fed to the delay device 92. Output 94 is derived from output 74 of the photo-electric device, as follows. Output 74 is boosted when the cutting oxygen is turned on and cutting commences properly, due to the increased illumination of the device 73 by the cutting flame. The boosted output 74 is amplified by amplifier 75 and is strong enough to operate relay 76 to produce output 94 for feeding to the delay device 92. Output 93 to the alarm and control unit 90 therefore is present only in the absence of output 94, and the latter will only be absent if cutting fails to commence when the cutting oxygen is turned on, or if the cut is lost for any reason when a contour is being cut. Activation of the alarm and control unit 90 by output 93 due to a failure of cut produces the effects already mentioned above, including complete stoppage of all machine movements, as by cut-out switches.

Operation of alarm and control unit 90 necessitates the re-establishment of a cutting flame before cutting can re-commence, and there is indicated in FIG. 3, in association with alarm and control unit 90, firstly a manual re-setting control unit 95, by means of which for example the cut-out switches above referred to can be re-set, and secondly a manual re-start control 96 which is indicated by the lines 97 as being adapted to re-start the sequence of operations for the establishment of a cutting flame with re-activation of the heating gases relay 63.

Electrical control units 51, 63, 70, 81 and 83, which are the major units in the separate electrical control system for effecting the establishment of a cutting flame, have been spaced apart in FIG. 3 along the previously-mentioned time axis running from top to bottom, to indicate that their functioning is spaced in time, but it will be appreciated that the equipment which provides the separate electrical control system could in practice be assembled, for example, in the form of control console.

Returning now to FIG. 3, the description can conveniently be concluded by explaining that after the operation of the cutting oxygen control unit 83 and the re-starting of the drive of the record tape 42, the cutting operation is depicted in time by the vertical spacing between the unit 83 and the machine operation represented by the rectangle 98. It is indicated by the line 99 that this operation 98 is effected by a tape signal indicated at 100, and decoded of course by tape-reader 47, the operation 98 consisting of locking the height sensing device 52 against operation to effect movement of the nozzle block 53 in the vertical direction and de-energizing the photo-electric device 73, to prevent possible erratic operation of these devices at the end of the cutting operation.

A succeeding tape signal is represented at 101 as effecting the operation, indicated by the line 102 and rectangle 103, of raising the nozzle block 53 and closing gas supply valve 67, 68 and 86, while a final tape signal 104 is represented by the line 105 and rectangle 106 as effecting the operation of stopping the tape.

No attempt is made to indicate in FIG. 3 how tape signals 100, 101 and 104 actually affect the electrical control system, but it will be apparent that signal 101 will affect the height sensing device 52, as by actuating a switch or relay to prevent signals therefrom reaching the motor 54, that signal 101 will affect motor 54 of the height sensing system, such as by energizing "up" control 57 of said system, and also affect relays 63 and 83 to close the gas supply valves, while signal 104 will stop the tape drive motor 44 as by "stop" control 46.

It will be seen that the invention provides a flame-cutting machine which is fully automatic in operation, due to the combination with the known electrical control system for moving a tool along a predetermined path of a separate electrical control system for the establishment or re-establishment of a cutting flame at a cutting nozzle of the machine, and whereas it has not been attempted to show in any precise detail the electrical relay, delay and timing devices referred to in connection with FIG. 3 of the drawings, it will be appreciated that the actual form which such devices may take is capable of wide variation within the ordinary knowledge of those skilled in the electrical art.

What we claim is:

1. In a flame-cutting machine having a cutting nozzle carried by a cutting head which is movable along a transverse beam by a first electric motor, the beam being movable bodily along guides by a second electric motor, whereby said nozzle is movable horizontally in all directions for profile-cutting of a workpiece, and the nozzle also being movable vertically by motor means to adjust the vertical spacing between the nozzle and the workpiece, the combination with a coded signal tape, a signal decoder, means operative to move the tape past said decoder, a first electrical system including and controlling the decoder and the tape moving means and said first and second electric motors for energising said motors in response to said coded signal tape for moving said nozzle over a predetermined path of movement, of instrumentalities which collectively provide for the establishment of a cutting flame at said nozzle, incorporating electrical spacing sensing means adjacent said nozzle for control of said motor means in the sense to maintain a predetermined spacing between the nozzle and the workpiece, conduit means for supplying preheat gas to said nozzle, on-off valve means in said conduit means, first electrical actuating means for operating said on-off valve means, electrical gas ignition means adjacent said nozzle tip, conduit means for supplying cutting oxygen to said nozzle, on-off valve means in said conduit means, second electrical actuating means for operating said on-off valve means, photo-electric flame-responsive sensing means adjacent said nozzle, and a second electrical control circuit which includes each of said spacing means, first and second electrical actuating means, electrical gas ignition means, photo-electric flame-responsive sensing means and said decoder, but is otherwise separate from said first electrical system, the second electrical control circuit also including electrical relay means and electrical timer means for effecting sequential operation of said instrumentalities, and the electrical interconnection between said first electrical system and the second electrical control circuit via said decoder being operative for fully automatic functioning of said flame-cutting machine in the sense that signals derived from the coded signal tape are effective to deactivate the tape moving means to cause stoppage thereof and to initiate automatic sequential operation of said instrumentalities by means of said electrical relay means and timer means for establishing a cutting flame at said nozzle while said coded tape is stationary, followed at the conclusion of said sequence by reactivation of said tape moving means, said sequence comprising lowering of the cutting nozzle towards the workpiece by energisation of said motor means, and energisation of said spacing sensing means, activation of said first electrical actuating means for providing preheat gas supply to said nozzle, activation of said gas ignition means, sensing of the flame by said photo-electric flame-responsive sensing means and the timing of a preheat period during which ignited preheat gases heat the workpiece to cutting temperature, activation of said second electrical actuating means for providing cutting oxygen supply to said nozzle, and reactivation of the tape moving means in response to a signal from said photo-electric flame-responsive sensing means indicative of satisfactory flame-cutting conditions at said nozzle, and additional relay means in said second control circuit governed by the photo-electric flame-responsive sensing means, and an electrical alarm and control device governed by said additional relay means for energisation thereof to provide an alarm signal in the absence of a predetermined output from said photo-electric flame-responsive means.

2. The combination stated in claim 1, and means in said second electrical control circuit governed by the decoder and responsive thereto for deactivating the photo-electric flame-responsive sensing means and simultaneously deactivating the nozzle spacing sensing means until a subsequent tape signal to the decoder effects reactivation thereof.

References Cited in the file of this patent
UNITED STATES PATENTS

| | | |
|---|---|---|
| 2,089,029 | Jones | Aug. 3, 1937 |
| 2,177,276 | Bucknam | Oct. 24, 1939 |
| 2,244,822 | Bucknam | June 10, 1941 |
| 2,427,178 | Aubert | Sept. 9, 1947 |
| 2,520,193 | Begerow | Aug. 29, 1950 |
| 2,570,405 | Tandler et al. | Oct. 9, 1951 |
| 2,766,982 | Bechtle et al. | Oct. 16, 1956 |

OTHER REFERENCES

Metalworking Production, vol. 101, Dec. 6, 1957, pages 2177–2179.

Process Control and Automation, vol. 5, January 1958, pages 22–24.

The Iron Age, May 1, 1958, vol. 181, No. 18; pages 90, 91.